US006418349B1

(12) United States Patent
Hahn et al.

(10) Patent No.: US 6,418,349 B1
(45) Date of Patent: Jul. 9, 2002

(54) ARRANGEMENT AND METHOD FOR THE TRANSMISSION OF ADDRESS, INSTRUCTION AND/OR DATA TELEGRAMS

(75) Inventors: Friedrich Hahn, Schenefeld; Gerd Schippmann, Bad Bramstedt; Volker Meyer; Kirsten Ohl, both of Hamburg, all of (DE)

(73) Assignee: Koninklijke Philips Electronics N.V., New York, NY (US)

( * ) Notice: Subject to any disclaimer, the term of this patent is extended or adjusted under 35 U.S.C. 154(b) by 0 days.

(21) Appl. No.: 09/329,033

(22) Filed: Jun. 9, 1999

(30) Foreign Application Priority Data

Jun. 19, 1998 (DE) .......................... 198 27 337

(51) Int. Cl.[7] .............................. G06F 13/42
(52) U.S. Cl. .......................... 700/3; 710/110
(58) Field of Search .................... 700/3, 4, 9, 20, 700/21, 79; 710/110; 712/31; 709/208

(56) References Cited

U.S. PATENT DOCUMENTS

| 5,925,118 A | * | 7/1999 | Revilla et al. | ............... 710/110 |
| 5,940,851 A | * | 8/1999 | Leung | .......................... 711/106 |
| 6,256,693 B1 | * | 7/2001 | Platko | .......................... 710/105 |

* cited by examiner

Primary Examiner—Paul P. Gordon
(74) Attorney, Agent, or Firm—Steven R. Biren

(57) ABSTRACT

An arrangement and a method are described for the transmission of address, instruction and/or data telegrams from a control unit to (at least) one controlled unit and for the return of a respective reception acknowledge signal from the controlled unit (units) to the control unit in response to each address, instruction and/or data telegram, the reception acknowledge signal signaling the control unit the correct transmission of the relevant address, instruction and/or data telegram. In order to configure a device and a method of this kind in such a manner that limited quantities of data can be transmitted to the control unit also without incorporating bus transmitter stages in the controlled units, according to the invention in (at least) one controlled unit the reception acknowledge signal in response to one of the address, instruction and/or data telegrams is suppressed, exclusively in dependence on a selectable parameter of the operating state of the controlled unit, also in the case of correct transmission of the address, instruction and/or data telegram; the control unit in that case is always signaled an incorrect transmission and the nonarrival in the control unit of a reception acknowledge signal in response to said address, instruction and/or data telegram is evaluated as an information signal concerning the selectable parameter of the operating state of the controlled unit.

7 Claims, 4 Drawing Sheets

ARRANGEMENT AND METHOD FOR THE TRANSMISSION OF ADDRESS, INSTRUCTION AND/OR DATA TELEGRAMS

BACKGROUND OF THE INVENTION

The invention relates to an arrangement which includes a control unit (master) and at least one controlled unit (slave) for the transmission of address, instruction and/or data telegrams from the control unit to the (at least one) controlled unit (units) and for the return of a respective reception acknowledge signal from the controlled unit (units) to the control unit in response to each of the address, instruction and/or data telegrams, the reception acknowledge signal signaling the control unit the correct transmission of the relevant address, instruction and/or data telegram.

The invention also relates to a method for the transmission of address, instruction and/or data telegrams from a control unit to (at least) one controlled unit and for the return of a respective reception acknowledge signal from the controlled unit (units) to the control unit in response to each of the address, instruction and/or data telegrams, the reception acknowledge signal signaling the control unit the correct transmission of the relevant address, instruction and/or data telegram.

Arrangements and methods of this kind are employed in so-called $I^2C$ bus systems, so control and data bus systems which are preferably used for the control and the exchange of data in complex electronic communication arrangements, preferably in entertainment electronics. Such $I^2C$ bus systems notably interconnect circuit sections accommodated in different integrated semiconductor circuits. The control unit (master) can thus transmit data or instructions to one or more controlled units via the bus. The controlled units require a bus receiver stage for this purpose.

However, if data is to be transmitted also from the controlled units (slaves) to the control unit (master), the controlled units should also be provided with a bus transmitter stage. A combined bus receiver stage and bus transmitter stage (transceiver) requires approximately from 30 to 40% more components than a bus receiver stage alone. If the controlled units are to transmit data to a limited extent only, providing the relevant integrated semiconductor circuit with a bus transmitter stage for this purpose alone would be very uneconomical because of the associated larger surface area required on the semiconductor body.

OBJECTS AND SUMMARY OF THE INVENTION

It is an object of the invention to conceive an arrangement and a method of the kind set forth in such a manner that data can be transmitted to the control unit to a limited extent also without providing bus transmitter stages in the controlled units.

This object according to the invention is achieved in an arrangement of the kind set forth in that at least one of the controlled units is constructed in such a manner that the reception acknowledge signal in response to at least one of the address, instruction and/or data telegrams is suppressed, exclusively in dependence on a selectable parameter of the operating state of the controlled unit, also in the case of correct transmission of the address, instruction and/or data telegram, the control unit in that case always being signaled an incorrect transmission, and that the control unit includes an evaluation section in which the nonarrival of a reception acknowledge signal in response to said address, instruction and/or data telegram is received and processed as an information signal concerning the selectable parameter of the operating state of the controlled unit.

According to the invention, moreover, the method of the kind set forth is characterized in that in (at least one) controlled unit (units) the reception acknowledge signal in response to at least one of the address, instruction and/or data telegrams is suppressed, exclusively in dependence on a selectable parameter of the operating state of the controlled unit, also in the case of correct transmission of the address, instruction and/or data telegram, the control unit in that case always being signaled an incorrect transmission, and that the nonarrival of a reception acknowledge signal in the control unit in response to said address, instruction and/or data telegram is evaluated as an information signal concerning the selectable parameter of the operating state of the controlled unit.

Thus, according to the invention the reception acknowledge signal from the relevant controlled unit addressed by the control unit is used not only to acknowledge the correct transmission of the address, instruction and/or data telegram but, without using additional circuit means, but also to return information to the control unit. The functions required for this purpose are incorporated in the components of the control unit and the controlled unit (units) which are required any way for the sequencing of the instruction and/or data transmission between said units. Special address, instruction and/or data telegrams can be provided in response to which a given parameter of the operating state is tested in the relevant addressed controlled unit, or possibly also in a plurality of controlled units simultaneously, and the associated reception acknowledge signal is returned or not, depending on the result of said test. Using a fixed preset within the controlled unit (units), a given parameter of the operating state can then be interrogated in principle, for example whether the supply voltage reaches a given threshold value or not. On the basis of the type of transmitted address, instruction and/or data telegram, however, a selection between a plurality of parameters to be tested in respect of the operating state of the controlled unit (units) can be made in the controlled unit (units). For example, state registers can thus be interrogated. This interrogation can be selected on the one hand by encryption within the address, instruction and/or data telegram or be performed successively for the parameters of interest in conformity with a predetermined instruction sequence. In order to execute the instruction sequences required for this purpose, the control unit includes an evaluation section which may be constructed as a separate logic circuit or is preferably included in a sequencer which is provided any way for the transmission of the address, instruction and/or data telegrams. The nonarrival of a reception acknowledge signal is detected in said evaluation section as information concerning the selected parameter of the operating state of the addressed controlled unit (units). To this end, the evaluation section preferably comprises an instruction sequencer which may involve control instructions whereby the detected operating state can be deliberately changed, if desired.

The invention thus enables an expansion of the information exchange between the control unit and the controlled unit (units), without it being necessary to provide the controlled unit (units) with an additional transmitter stage (stages) for the transmission of address, instruction and/or data telegrams to the control unit. A large number of circuit elements is thus saved. The invention is particularly attractive for the return transmission of merely small quantities of data for which the separate transmitter stages in the controlled units would not be used to full capacity. The invention can be used particularly advantageously for the interrogation of predetermined parameters with a response in the form of yes-no information. In an embodiment of the arrangement according to the invention each controlled unit (units) comprises (comprise) a respective monitoring device for monitoring the parameter or the parameters of the operating state and for suppressing the reception acknowledge signal in response to a selectable address, instruction and/or telegram, in dependence on the monitored parameter or parameters of the operating state.

A monitoring device of this kind preferably includes one or more state registers which are associated with the parameters of the operating state to be monitored and store information as regards the instantaneous value of the relevant parameter. Using especially encoded address, instruction and/or data telegrams, each of the parameters can then be specifically tested as to whether it has assumed a permissible value or not. In the latter case preferably the reception acknowledge signal of the associated address, instruction and/or data telegram is suppressed, so that the control t receives specific information that the addressed parameter of the operating state has changed admissibly. If desired, the evaluation section of the control unit can then initiate address, instruction and/or data telegrams whereby a specific correction of the operating state is performed.

As has already been stated, in a simple case an inadmissible value of a parameter of the operating state of a controlled unit in principle can also suppress the reception acknowledge signals in response to all incoming address, instruction and/or data telegrams. A separate interrogation by the control unit is then dispensed with; on the basis of the nonarrival of the reception acknowledge signals during the normal instruction and/or data transmission the control unit then detects a deviation of the operating state from the desired state. The evaluation section of the control unit then again initiates an appropriate step for the correction of the operating state of the addressed controlled unit.

In order to make a distinction between transmission errors in the address, instruction and/or data telegrams between the control unit and the controlled unit on the one hand and the signaling of an inadmissible operating state of the controlled unit on the other hand, in a further embodiment of the invention the nonarrival of a reception acknowledge signal in response to an address, instruction and/or data telegram initiates its repeated transmission by the control unit in a selectable sequence, information concerning the occurrence of the selectable parameter of the operating state of the controlled unit being deduced from a corresponding, repeated nonarrival of the reception acknowledge signal.

The repeated transmission of the address, instruction and/or data telegram and the associated recurrent suppression of the reception acknowledge signal can reduce the probability of a transmission error to such an extent that it may be assumed practically with certainty that a return message concerning the operating state is concerned. The desired probability with which this decision is to be made can be selected by way of the selected sequence, notably by way of the number of repeats for the transmission of the same address, instruction and/or data telegram. The selectable sequence also includes the possibility of testing given operating states with a given periodicity.

In a further embodiment of the arrangement according to the invention, in which an address, instruction and/or data telegram comprises an address section and an instruction or data section and in which a separate reception acknowledge signal is provided for each of these sections, the suppression of only the reception acknowledge signal for the instruction or data section is envisaged. Thus, the desired return transmission is performed merely by influencing the reception acknowledge signal for the instruction or data section, whereas the address section is always subject only to the test for correct transmission. This also enables specific interrogation for each individual controlled unit. When the address section also contains address information concerning a special register to be addressed or a component section of the controlled unit which is to be especially addressed via this register, a very specific interrogation can thus be performed.

A preferred application of the arrangement and the method according to the invention consists in that the selectable operating state of the controlled unit (units) is the state which occurs after a collapse of the supply voltage applied to the controlled unit (units).

A collapse of the supply voltage for the controlled unit (units) on the one hand can be simply detected and signaled and on the other hand has major effects on the operating state, i.e. the operational state of the relevant controlled unit. When the controlled unit comprises, for example memories which are at least partly erased in the case of a collapse of the supply voltage, an uncontrolled, undesirable operating state may occur after restoration of the supply voltage. Such a state must be recognized practically immediately by the control unit so that it can be eliminated by renewed initialization of the controlled unit. The invention enables this operation to be performed simply without requiring additional circuit means.

The arrangement and the method according to the invention are preferably used in electronic communication apparatus. A preferred field of application concerns electronic entertainment apparatus, for example television sets, video recorders or monitors. For example, in a monitor the deflection control can be monitored. The saving in respect of circuit elements as achieved according to the invention is particularly interesting in the case of mass products in large series in said fields of application.

BRIEF DESCRIPTION OF THE DRAWINGS

Embodiments of the invention will be described in detail hereinafter with reference to the drawing. Therein.

DETAILED DESCRIPTION OF THE PREFERRED EMBODIMENT

Figure 1:
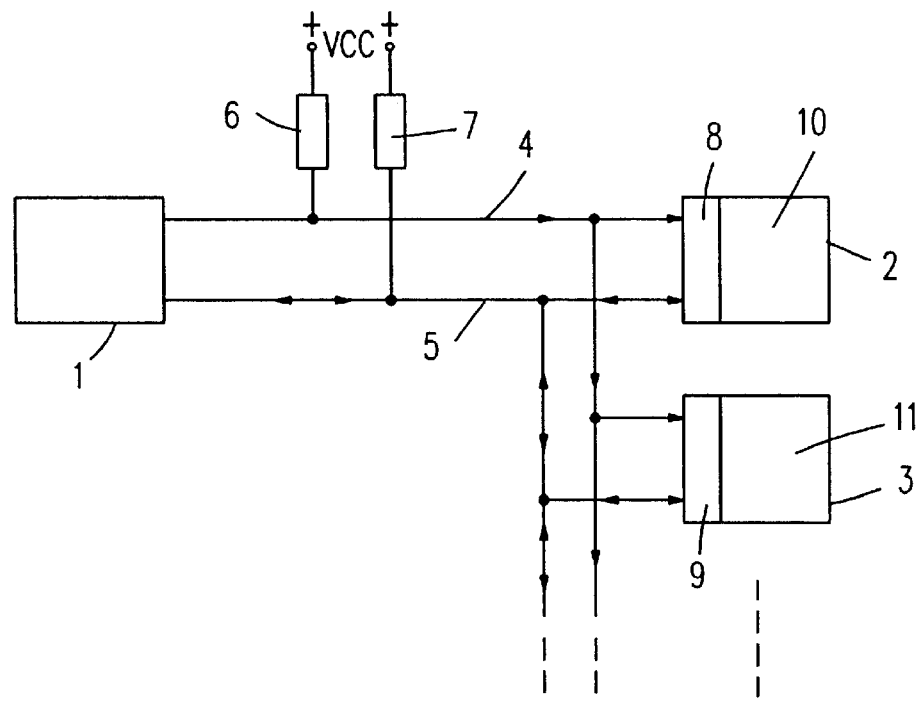
FIG. 1 shows a block diagram of a bus system for carrying out the invention.

For a first embodiment of the invention which is used in conjunction with the I²C bus, FIG. 1 shows the construction principle of the I²C bus system in the form of a coarse block diagram. Therein, the reference numeral 1 denotes a control unit which is connected to two controlled units 2, 3 (and possibly further controlled units) as shown in FIG. 1. In order to connect the control unit 1 to the controlled units 2, 3, there is provided a clock lead 4 via which the system clock is applied from the control unit 1 to the controlled units 2, 3 in order to synchronize the overall I²C bus system. The control unit 1, preferably including a microprocessor, is also referred to as "master". The controlled units 2, 3 form so-called "slaves" in the I²C bus system.

The information of the address, instruction and/or data telegrams within the I²C bus system is transmitted via a data lead 5 on which, as opposed to the clock lead 4, the signals can be transported in both directions, i.e. from the control unit 1 to the controlled units 2, 3 as well as in the opposite direction. This transmission is clocked by the system clock on the clock lead 4.

The clock lead 4 and the data lead 5 are connected, via a respective resistor 6, 7, to the positive pole VCC of a supply voltage source which also feeds the control unit 1 and the controlled units 2, 3. Consequently, the clock lead 4 and the data lead 5 in principle carry a positive potential and can be pulled to a low potential for the individual pulses of the system clock or the correspondingly set bits of the address, instruction and/or data telegrams. Each of the controlled units 2, 3 includes a bus receiver stage 8, 9 via which the associated controlled element 2, 3 is connected to the clock lead 4 and the data lead 5 and in which the conversion and processing of the address, instruction and/or data telegrams from the control unit 1 into corresponding data or instructions take place for the operation of that part of the controlled units 2, 3 whereby the (sub-)function of the apparatus utilizing the I²C bus is carried out. These parts of the controlled units 2, 3 are shown as functional sections bearing the reference numerals 10 and 11. Such a functional section is, for example, the deflection control for the picture tube in a monitor.

For a transmission of address, instruction and/or data telegrams from the controlled units 2, 3 to the control unit 1, use can be made of a so-called transceiver instead of the bus receiver stages 8, 9, which transceiver comprises a combination of the bus receiver stage and a bus transmitter stage. Such an arrangement, however, is significantly more complex than a pure bus receiver stage; in the case of an I²C bus it notably requires approximately from 30 to 40% more circuit elements in comparison with a simple bus receiver stage. This increased number of circuit elements can be avoided by carrying out the invention.

Figure 2:
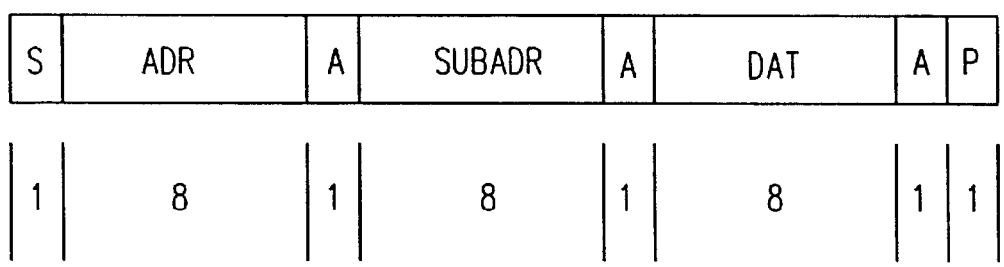
FIG. 2 shows diagrammatically the configuration of an address, instruction and/or data telegram as used during operation of the arrangement shown in FIG. 1.

FIG. 2 shows an example of the temporal configuration of an address, instruction and/or data telegram, the various segments of the telegram being depicted as blocks along a time axis extending horizontally to the right. For this example, moreover, FIG. 2 also shows the relevant length of the individual segments of the telegram as a number of data bits.

An address, instruction and/or data telegram of the kind shown in FIG. 2 begins with a start bit S which is succeeded by an 8-bit address ADR which identifies the controlled unit to be addressed. The address ADR terminates with a time interval which is reserved for a reception acknowledge signal A. In conformity with the generally known I²C bus protocol, the control unit 1 is switched over from the transmission mode to the receiving mode during the time interval associated with the reception acknowledge signal A, so that the potential on the data lead 5 increases to that of the positive pole VCC of the supply voltage source. When the controlled unit supplies a reception acknowledge signal on the data lead 5, the controlled unit switches the data lead 5 to the low potential within the associated time interval. This change of potential is identified as a reception acknowledge signal by the control unit. However, if the potential on the data lead 5 remains high during the time interval provided for the reception acknowledge signal A, the control unit interprets this fact as a nonarriving reception acknowledge signal which is evaluated accordingly.

The time interval for the reception acknowledge signal A for the address ADR is succeeded by a telegram section which contains a sub-address SUBADR which addresses a given instruction or data register within the addressed controlled unit. Instructions or data to be transmitted by way of the telegram can be specifically entered via the sub-address SUBADR. When the present invention is used, for example state registers can thus be addressed for interrogation. The sub-address SUBADR is also terminated by a time interval in which a reception acknowledge signal A can be returned.

The third segment of the telegram of FIG. 2 contains a data word DAT; evidently, an instruction word can also be transmitted in this location when an instruction register is addressed by the sub-address SUBADR. The data word (or instruction word) DAT is again succeeded by a time interval for a reception acknowledge signal A whereby in this case the correct reception of the data word can be signaled. The telegram of FIG. 2 is terminated by a stop bit P.

Whereas the start bit S, the reception acknowledge signal A and the stop bit P each have a duration of one period of the system clock, the address ADR, the sub-address SUB-ADR and the data word DAT comprise eight bits each, so that each has a duration of eight periods of the system clock. According to the invention the processing of the data word DAT is performed in such a manner that, in dependence on the parameter of the operating state of the addressed, controlled unit to be tested, in response to the data word DAT a reception acknowledge signal is given exclusively in dependence on the value of said parameter, i.e. completely independently of the fact whether or not the telegram has been correctly transmitted. The reception acknowledge signals for the address ADR and the sub-address SUBADR, however, preferably are still given exclusively in dependence on whether or not the transmission has taken place correctly. Thus, the invention enables specific interrogation and testing of the information from a given sub-address within a given controlled unit. The evaluation section of the control unit, receiving the reception acknowledge signals, includes a sequencer in which the information from the reception acknowledge signal, present or absent, is evaluated so as to test the relevant parameter of the operating state and predetermined function sequences are initiated in response thereto.

Figure 3:
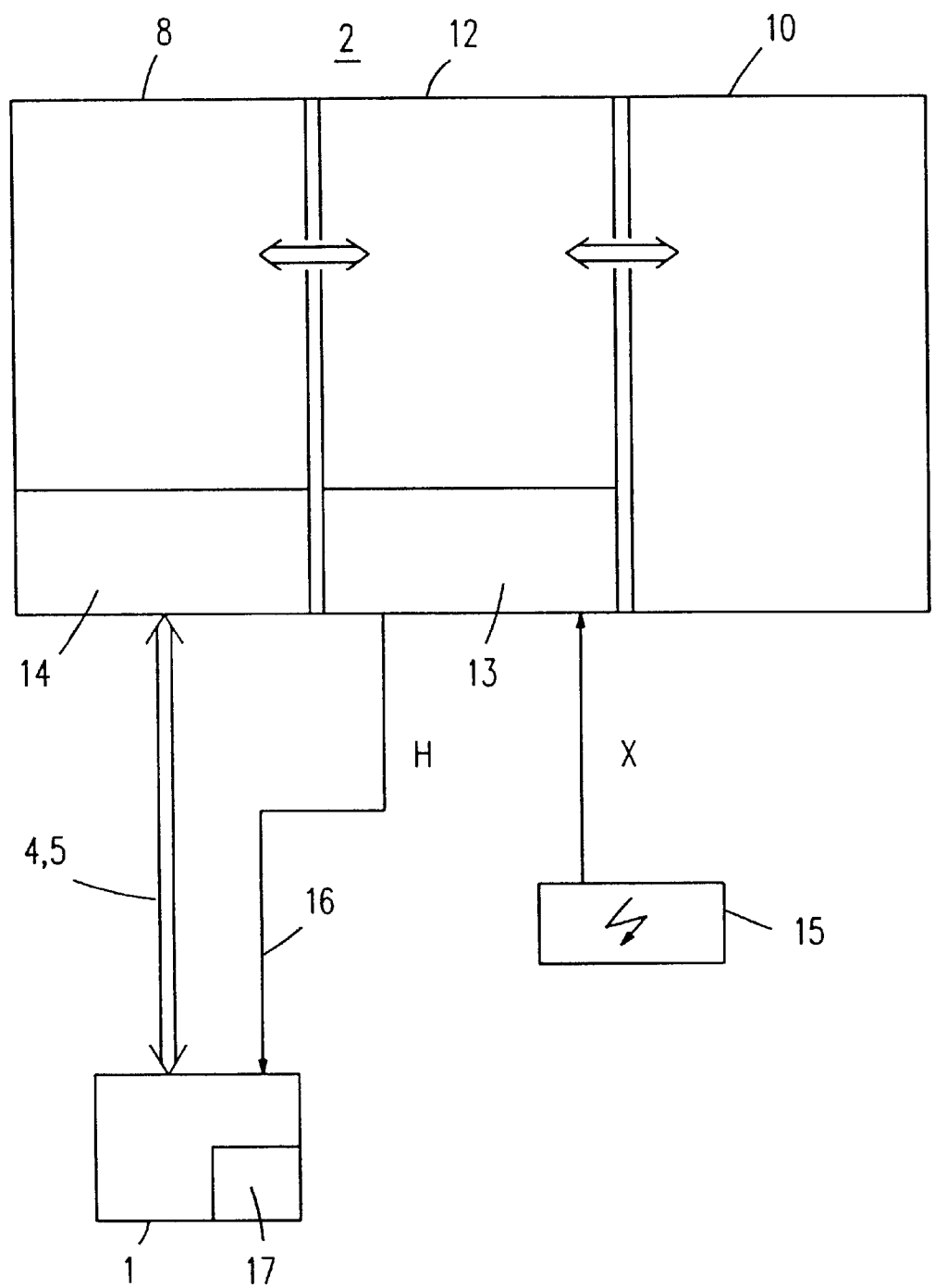
FIG. 3 shows a block diagram of an embodiment of an arrangement according to the invention which consists of a control unit and a controlled unit.

FIG. 3 shows a block diagram representing a further version of the arrangement shown in FIG. 1; therein, previously described elements are denoted by the same references. For the sake of simplicity, this embodiment is shown to include one controlled unit 2 only. In this embodiment the invention is used to monitor the operating state which occurs in the controlled unit 2 after a collapse of the supply voltage applied to the controlled unit 2.

By way of example a controlled unit 2 is shown in the form of an integrated circuit which is used to control the image display device (preferably a picture tube) in a television receiver, a monitor or the like. This circuit arrangement will be referred to hereinafter as the deflection control circuit. The deflection control circuit 2 of FIG. 3 includes, in addition to the bus receiver stage 8 and the functional section 10 which preferably comprises vertical and horizontal oscillators, a so-called geometry section etc., a converter section 12 which constitutes a connection therebetween and comprises instruction and/or data registers as well as digital-to-analog converters for the instruction and/or data flow from the bus receiver stage 8 to the functional section 10 as well as possibly analog-to-digital converters for the information flow in the reverse direction. The converter section 12 also includes a protection device 13 which performs the protection functions for the overall deflection control circuit 2.

For correct operation the overall deflection control circuit 2 requires a supply voltage which may not drop below a minimum value. Otherwise registers, for example in the converter section 12, are erased so that incorrect signal processing occurs in the functional section 10. Moreover, such incorrect signal processing-may also occur, while the register contents are still correct, if the supply voltage applied to the functional section 10 is too low. In order to ensure correct operation of the deflection control circuit 2 also after a collapse of the supply voltage, the control unit 1 must start the deflection control circuit 2 again in the same way as for the switching on of the supply voltage, i.e. upon putting into operation. After a collapse of the supply voltage the deflection control circuit 2 should never be allowed to operate further without special steps being taken.

In order to ensure correct operation upon putting into operation or after a collapse of the supply voltage and its restoration, for each section of the deflection control circuit 2 there is provided a separate supply voltage threshold. The lowest of these supply voltage thresholds is used in the bus receiver stage 8, so that this stage will certainly be in operation when the other sections are operational. As the supply voltage increases or decreases, the bus receiver stage 8 is activated as the first section of the deflection control circuit 2 or is switched off as the last section, respectively.

The central supply voltage threshold is intended for the converter section 12 so that, for example when the deflection control circuit is into operation the registers present in the converter section 12 can be loaded by the bus receiver stage 8 even before the functional section 10 becomes operational. Conversely, in the case of a decrease of the supply voltage the elements in the converter section 12 still remain in operation when the functional section 10 is switched off. Such switching off of the functional section 10 occurs when the supply voltage drops below the highest one of the three supply voltage thresholds.

Hysteresis may be provided notably for the central supply voltage threshold of the converter section 12; however, the corner points thereof must be situated within the limits imposed by the lowest and the highest supply voltage threshold. In that case slight fluctuations of the supply voltage cannot cause continuous switching on and off of the converter section 12.

The bus receiver stage 8 of the deflection control circuit 2 of FIG. 3 includes a control register 14 in which notably all instructions and/or data of importance to the operation of the bus receiver stage 8 are written via the bus formed by the clock lead 4 and the data lead 5.

The protection arrangement 13 of the converter section 12 of the deflection control circuit 2 is provided with a monitoring input X and a monitoring output H. The monitoring input X is connected to a high-voltage generating stage 15. It receives a measured value which is derived from the value of the acceleration voltage, generated in the highvoltage generating stage 15, for the image display device of the television apparatus or monitor in which the deflection control circuit 2 is used. When the acceleration voltage exceeds a predetermined limit value so that there is a risk of increased emission of X-rays, an appropriate signal is given via the measured value applied to the monitoring input. Via the protection arrangement 13, the deflection control circuit 2, notably the functional section 10 thereof, is then controlled in such a manner that the image display device is blanked. The generation of detrimental X-rays is thus avoided.

The monitoring output H of the protection arrangement 13 is connected to the control unit 1 via a connection 16 which is not included in the bus 4, 5. The control unit includes an evaluation section 17 in which the nonarrival of a reception acknowledge signal in response to the address, instruction and/or data telegrams transmitted by the control unit 1 is evaluated as an information signal concerning the operating state (or the parameter thereof) to be monitored. In the present example a signal on the monitoring output H of the control unit 1 indicates whether the functional section 10 of the deflection control circuit 2 operates as required or whether deviations occur. In the example of FIG. 3 three cases with different external effects occur for the operating state to be monitored, depending on the value of the supply voltage occurring and on the measured value supplied via the monitoring input X; in the first case the deflection control circuit 2 is switched off, and the image display device does not display an image; in the second case the deflection control circuit 2 is in operation, but the image display device still does not display an image; in the third case the deflection control circuit 2 operates as required and the image display device also displays the normal image. Intermediate phases which are less recognizable externally are also possible, for example the bus receiver stage 8 is in operation as the only section of the deflection control circuit 2, or the bus receiver stage 8 and the converter section 12 operate correctly but the function section 10 does not. The parameter of the operating state to be monitored is measured as the value of the supply voltage actually present in comparison with the supply voltage thresholds. The arrangement according to the invention (and also the method according to the invention) can thus perform a more exact analysis of the operating state and, if necessary, to instruct the control unit 1 to restore the state. The invention notably enables simple recognition of the fact whether the image display device does not show an image because the acceleration voltage in the high-voltage generating stage 15 has become too high or because the supply voltage applied to the deflection control circuit 2 is too low.

As a simple example of a function sequence in the arrangement of FIG. 3 it is assumed that, after a collapse of the supply voltage, the registers in the converter section 12 have been erased and hence the function section 10 has gone out of step. In this case given instructions and/or data are set in the control register 14 in such a manner that in a subsequent address, instruction and/or data telegram the reception acknowledge signal for the data word DAT is in principle suppressed. By repeated transmission of said telegram and corresponding recurrent suppression of the reception acknowledge signal an information signal is generated in the evaluation section 17 such that it indicates the occurrence of the relevant operating state. The information concerning the actual operating state can be confirmed by interrogation of the signal on the connection 16 from the monitoring output H. Via the bus 4, 5, the control unit 1 can then transmit address, instruction and/or data telegrams which restore the normal operating state of the deflection control circuit 2.

Figure 4:
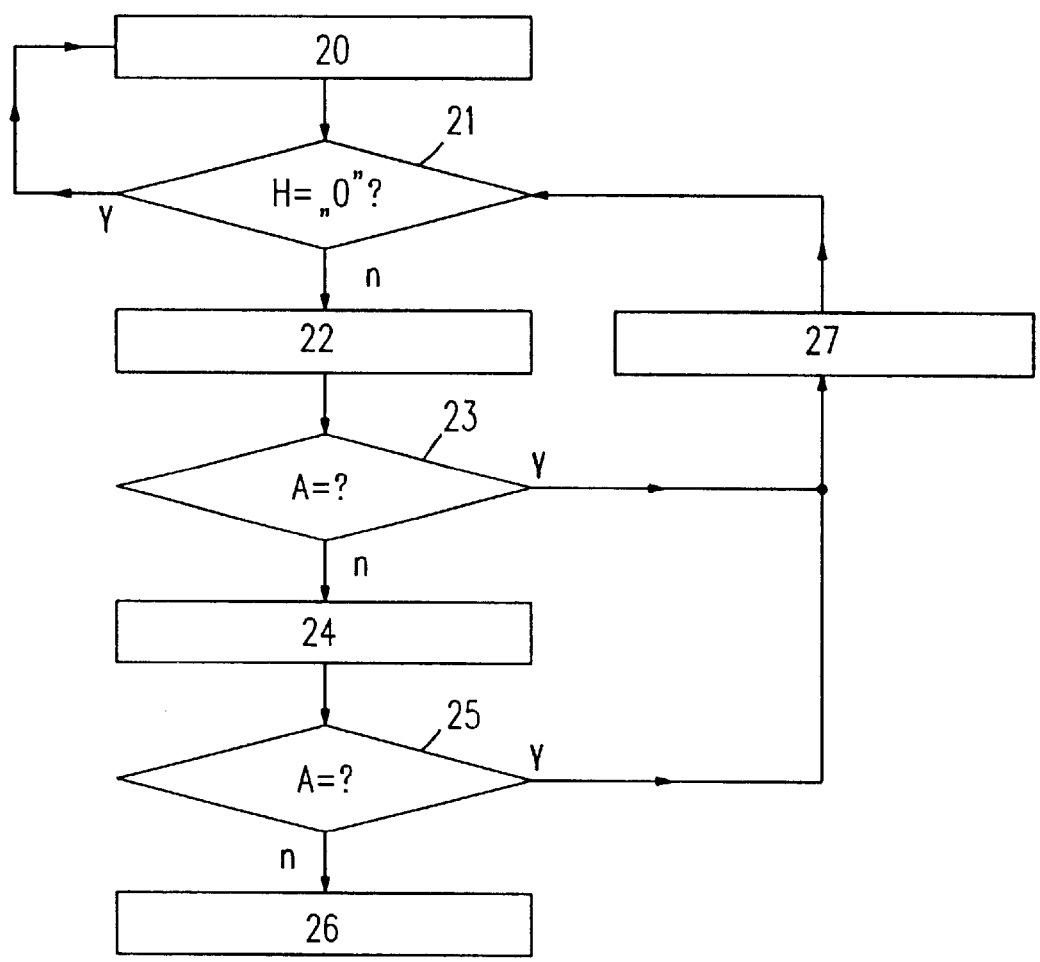
FIG. 4 shows a flow chart concerning a first example of the operation of an arrangement according to the invention or a first example of the method according to the invention.

FIG. 4 shows a flow chart for an operating sequence in an embodiment of the invention which is preferably executed by means of an arrangement as shown in FIG. 3. The operating sequence, shown by way of example, is based on the specified operating state of the controlled unit 2, i.e. it is assumed that all functions of the functional section 10 are correctly executed in the controlled unit 2. This is represented by the "normal operation" block 20 in the flow chart of FIG. 4. The control unit 1 continuously monitors, via the connection 16, the signal from the monitoring output H. The normal operation continues for as long as the logic level of the signal is low. Between the interrogation of the monitoring output H, bearing the reference numeral 21, and the "normal operation" block 20, therefore, a loop exists via the "yes" output j of the interrogation block 21; this loop is abandoned only when the signal from the monitoring output H assumes a high logic level. Via the "no" output n of the interrogation block 21, the signal processing step 22 is then initiated; during this step a first telegram is transmitted whose configuration corresponds to FIG. 2. In the controlled unit 2, notably in the bus receiver stage 8, in response to the data word DAT of the telegram a reception acknowledge signal is returned or not, depending on the operating state of the controlled unit 2. The arrival of this reception acknowledge signal is tested in the control unit 1 by the interrogation block 23 in the flow chart. In the case of nonarrival of the acknowledge reception signal in response to the data word DAT, the next processing step is initiated via the "no" output n, this step is represented by the function block 24. The execution of this block corresponds to that of the block 22, i.e. said first telegram is transmitted again in unmodified form. This block is succeeded by the interrogation block 25 in which, like in the interrogation block 23, the reception acknowledge signal in response to the data word DAT of the telegram is tested. If this reception acknowledge signal again has not been returned, it is assumed that the controlled unit 2 is subject to a rather substantial operational disturbance, for example due to a collapse of the supply voltage. Via the "no" output n of the interrogation block 25, the function block 26 is then initiated; this block executes a completely new restart or initialization of the controlled unit 2. To this end, upon occurrence of the collapse of the supply voltage the controlled unit 2 may have entered the so-called standby mode which occurs whenever the supply voltage drops below the central supply voltage threshold and in which only the bus receiver stage 8 is in operation.

When the first interrogation 23 or the second interrogation 25 after the reception acknowledge signal in response to the data word DAT recognizes the latter word as being present, a further function block which is denoted by the reference numeral 27 is reached via the "yes" outputs j of the interrogation blocks 23 or 25. The controlled unit 2, notably its converter section 12, is constructed in such a manner that the reception acknowledge signal in response to the data word DAT in the first telegram is suppressed only if the supply voltage has decreased to an inadmissible extent, whereas the signal from the monitoring output H indicates a failure of the function section 10 irrespective of the cause thereof. If a reception acknowledge signal occurs no later than during the interrogation 25 during the transmissions of the first telegram, it may be assumed that sufficiently high supply voltage was and is continuously present (since otherwise the reception acknowledge signal in response to the data word DAT would in principle have been suppressed), so that the converter section 12 operates correctly, i.e. error-free register contents are present in this converter section 12. It then suffices to correct the operation sequences in the function section 10, for example to synchronize the horizontal or vertical oscillators, without complete re-initialization by the converter section 12 being required. This signal processing step is also referred to as a "soft start".

Figure 5:
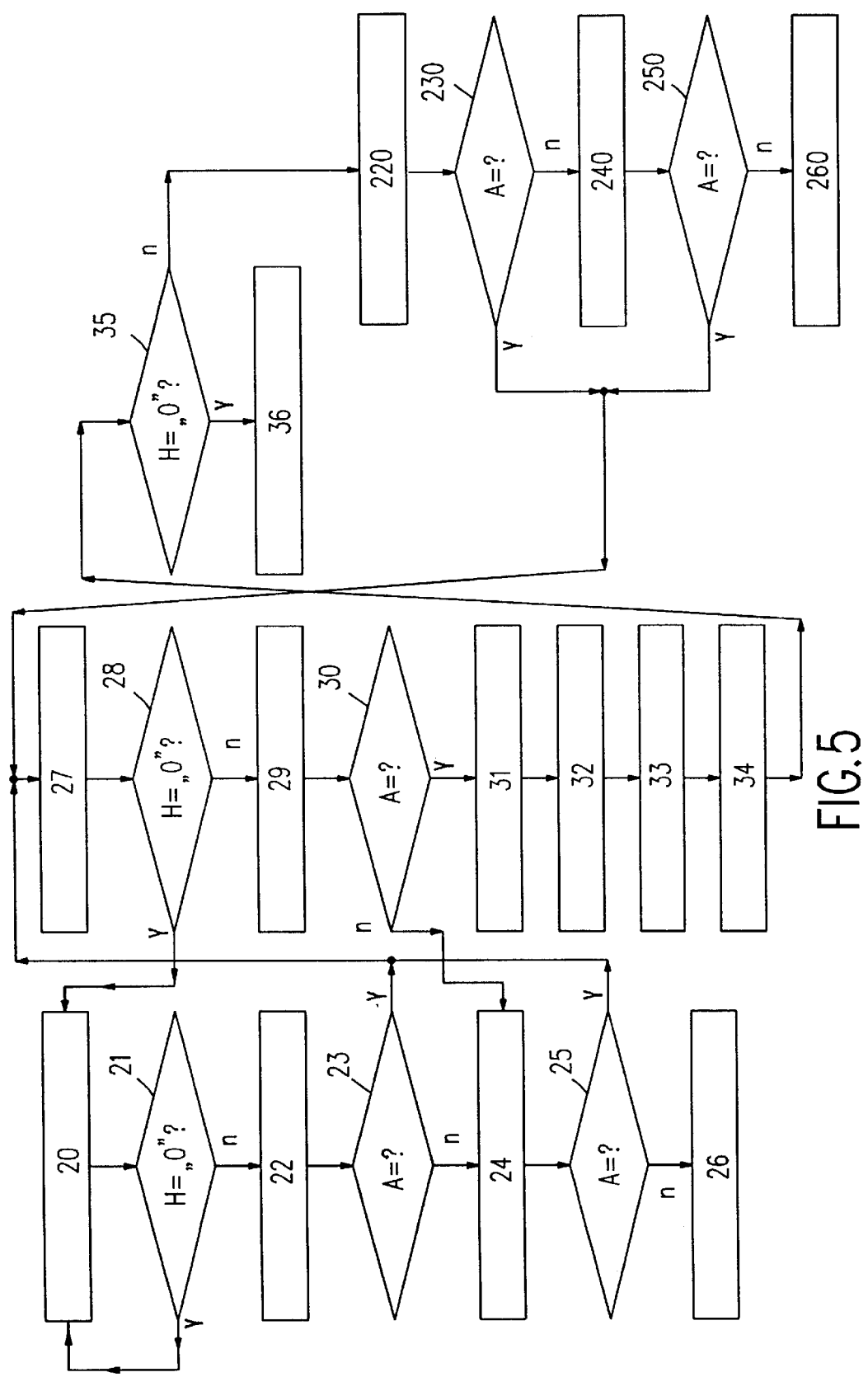
FIG. 5 shows a flow chart for a second example of this kind.

The flow chart of FIG. 5 is an extension of the version shown in FIG. 4; previously described function blocks are again denoted by the same references. Whereas, after the "soft start" function block 27 in the version of FIG. 4 a return takes place to the interrogation block 21 after the signal on the monitoring output H and hence to the interrogation loop which is continuously executed during normal operation (function block 20) of the controlled unit 2, after the execution of the function block 27 in FIG. 5 a further interrogation block 28 is executed in which the signal from the monitoring output H is tested in conformity with the interrogation block 21. Even though a return takes place from the "yes" output j of the interrogation block 28 to normal operation 20, the operation sequence of the control unit 1 reaches a function block 29 via the "no" output n of the interrogation block 28. The subsequent operation sequence (commencing with the function block 29) between the control unit 1 and the controlled unit 2 preferably serves for the analysis of the cause of the operation failure in the controlled unit 2. To this end, in the function block 29 first the above-mentioned first telegram is transmitted from the control unit 1 to the controlled unit 2. During the subsequent interrogation block 30, the reception acknowledge signal A in response to the data word DAT of the first telegram is tested again. In the case of nonarrival of this reception acknowledge signal A, the function block 24 is initiated via the "no" output n of the interrogation block 30. However, if a reception acknowledge signal A has arrived, the sequence proceeds to the function block 31 via the "yes" output j of the interrogation block 30.

When the interrogation 30 shows that a reception acknowledge signal A has arrived in response to the data word DAT in the first telegram even though after the soft start in the function block 27 the signal from the monitoring output H has a high logic level, it may be assumed that the supply voltage for the controlled unit 2 was correctly available so that the soft start has remained unsuccessful for a different reason. In order to find such a reason, in the function block 31, succeeding the "yes" output j of the interrogation block 30, the supply voltage for the controlled unit 2 is deliberately switched off. After a predetermined period of time has elapsed, the supply voltage for the controlled unit 2 is switched on again during the subsequent function block 32, that is to say with a value higher than the highest supply voltage threshold. Such switching off and on of the controlled unit 2 constitutes the sole possibility for leaving the operating state in which the monitoring output H carries the high logic level and the reception acknowledge signal A in response to the data word DAT of said first telegram signals the correct presence of the supply voltage.

The switching on of the supply voltage in the function block 32 is succeeded by an instruction and/or data transmission in the function block 33 which makes the converter section 12 in the controlled unit 2 ready for operation again. This initialization of the converter section 12 is succeeded by a soft start of the functional section 10 in the function block 34. After the controlled unit 2 has been completely put into operation again in this manner, the level of the signal from the monitoring output H is tested again in the interrogation block 35. If the logic level of this signal is then low, the control unit 1 enters the function block 36 in the flow chart of FIG. 5. However, if the logic level of the signal from the monitoring output H is still high, via the "no" output n of the test block 35 a second branch in the flow chart is reached; this branch includes the function and interrogation blocks 220, 230, 240, 250 and 260 which directly correspond to the function blocks 22, 23, 24, 25 and 26, respectively, in respect of content and combination in operation. The branch comprising the blocks 220 to 260 also performs a test as regards the presence of the supply voltage. If the result of this test is positive, a jump to the function block 27 takes place and a further soft start is carried out. However, if the test is not successful, there is a collapse of the supply voltage, or such a collapse is assumed to be present; like in the function block 26, in the function block 260 this fact is evaluated as information meaning that new initialization, i.e. a complete restart of the controlled unit 2 is required, meaning that the latter unit is in the "standby" mode.

However, if subsequent to the interrogation block 35 the function block 36 is reached, the control unit 1 evaluates, via its evaluation section 17, this information to mean that detection of an overvoltage has taken place via the monitoring input X, thus causing the appearance of the signal on the monitoring output H, so that the measured value entered for the acceleration voltage from the high-voltage generating stage 15 has signaled an excessive value of the acceleration voltage. In the controlled unit 2 this signaling again results in the switching off of the functional section 10 and the output of a signal having a high logic level via the monitoring output H.

In addition to the described detection of a collapse of the supply voltage, the invention can also be used for the transmission of other information from the controlled unit 2 to the control unit 1. To this end, notably the data word DAT of the telegram of FIG. 2 may be given in a different way so as to interrogate different information in a specific manner. A repeatedly suppressed reception acknowledge signal A in response to this data word DAT is then evaluated as a specific reply, but no longer as a message concerning a transmission error. This type of information transmission can be associated with other measurements, for example with the monitoring of the signal from the monitoring output H of FIG. 3. Similarly, the suppression of the reception acknowledge signal in response to predetermined sub-addresses SUBADR can be used for the transmission of information concerning the operating state of the addressed controlled unit. This acquisition of information can also be supplemented by way of accompanying measurements.

The invention utilizes notably an I²C bus receiver stage for the return of state information, via the bus system, by way of specific suppression of the reception acknowledge signal also after successful data transmission. A reception acknowledge signal suppressed in a predetermined location is evaluated by the control unit in such a manner that it initiates a specific function sequence for the analysis and/or correction of the operating state. This function sequence may comprise the transmission of further, specifically configured address, instruction and/or data telegrams, but may also comprise accompanying measurements which are independent thereof. As a result, information concerning the operating state can be acquired without it being necessary to provide separate bus transmitter stages in the controlled units of the I²C bus system.

The invention can be used for all bus systems having the described properties of an I²C bus system, as well as for all apparatus in which such bus systems are used.

What is claimed is:

1. An arrangement which includes a control unit (master) and at least one controlled unit (slave) for the transmission of address, instruction and/or data telegrams from the control unit to the (at least one) controlled unit (units) and for the return of a respective reception acknowledge signal from the controlled unit (units) to the control unit in response to each of the address, instruction and/or data telegrams, the reception acknowledge signal signaling the control unit a correct transmission of the relevant address, instruction and/or data telegram, characterized in that at least one of the controlled units is constructed in such a manner that the reception acknowledge signal in response to at least one of the address, instruction and/or data telegrams is suppressed, exclusively in dependence on a selectable parameter of the operating state of the controlled unit, also in a case of correct transmission of the address, instruction and/or data telegram, the control unit in that case always being signaled an incorrect transmission, and that the control unit includes an evaluation section in which the nonarrival of a reception acknowledge signal in response to said address, instruction and/or data telegram is received and processed as an information signal concerning the selectable parameter of the operating state of the or controlled unit.

2. An arrangement as claimed in claim 1, characterized in that each controlled unit (units) comprises (comprise) a respective monitoring device for monitoring the parameter (parameters) of the operating state and for suppressing the reception acknowledge signal in response to a selectable address, instruction and/or data telegram in dependence on the monitored parameter (parameters) of the operating state.

3. An arrangement as claimed in claim 1, characterized in that in the case of nonarrival of a reception acknowledge signal in response to an address, instruction and/or data telegram, the latter is transmitted again in a predetermined sequence by the control unit and information concerning the occurrence of the selectable parameter of the operating state of the controlled unit is derived from a corresponding repeated nonarrival of the reception acknowledge signal.

4. An arrangement as claimed in claim 1, in which an address, instruction and/or data telegram comprises an address section and an instruction or data section and in which a separate reception acknowledge signal is provided for each of these sections, characterized in that only the reception acknowledge signal for the instruction or data section is envisaged.

5. An arrangement as claimed in claim 1, characterized in that the selectable operating state of the controlled unit (units) is the state which occurs after a collapse of a supply voltage applied to the controlled unit (units).

6. A method for the transmission of address, instruction and/or data telegrams from a control unit to (at least) one controlled unit and for the return of a respective reception acknowledge signal from the controlled unit (units) to the control unit in response to each of the address, instruction and/or data telegrams, the reception acknowledge signal signaling the control unit a correct transmission of the relevant address, instruction and/or data telegram, characterized in that in (at least one) controlled unit (units) the reception acknowledge signal in response to at least one of the address, instruction and/or data telegrams is suppressed, exclusively in dependence on a selectable parameter of the operating state of the controlled unit, also in a case of correct transmission of the address, instruction and/or data telegram, the control unit in that case always being signaled an incorrect transmission, and that the nonarrival of a reception acknowledge signal in the control unit in response to said address, instruction and/or data telegram is evaluated as an information signal concerning the selectable parameter of the operating state of the controlled unit.

7. An electronic communication apparatus, characterized in that it includes an arrangement for carrying out the method claimed in claim 6.

* * * * *